United States Patent
Favaretto

(10) Patent No.: US 11,072,381 B2
(45) Date of Patent: Jul. 27, 2021

(54) HIGH-PERFORMANCE CAR WITH GAS PUSHERS

(71) Applicant: FERRARI S.p.A., Modena (IT)

(72) Inventor: Fabrizio Favaretto, Formigine (IT)

(73) Assignee: FERRARI S.P.A., Modena (IT)

( * ) Notice: Subject to any disclaimer, the term of this patent is extended or adjusted under 35 U.S.C. 154(b) by 30 days.

(21) Appl. No.: 16/724,651

(22) Filed: Dec. 23, 2019

(65) Prior Publication Data

US 2020/0207429 A1 Jul. 2, 2020

(30) Foreign Application Priority Data

Dec. 27, 2018 (IT) .......................... 102018000021100

(51) Int. Cl.
| | |
|---|---|
| *B60T 1/12* | (2006.01) |
| *B62D 37/00* | (2006.01) |
| *F04D 21/00* | (2006.01) |
| *B62D 37/02* | (2006.01) |

(52) U.S. Cl.
CPC ................ *B62D 37/00* (2013.01); *B60T 1/12* (2013.01); *B62D 37/02* (2013.01); *F04D 21/00* (2013.01)

(58) Field of Classification Search
CPC .. B60T 1/12; B60T 1/10; B62D 37/00; B62D 37/02
See application file for complete search history.

(56) References Cited

U.S. PATENT DOCUMENTS

| | | | |
|---|---|---|---|
| 2,724,450 A | 11/1955 | Kamps | |
| 3,719,256 A * | 3/1973 | Clark | ........................ B60T 1/12 188/2 R |
| 6,191,686 B1 | 2/2001 | Gabriel | |
| 6,712,168 B2 * | 3/2004 | Feldman | ................... B60T 1/12 180/271 |

(Continued)

FOREIGN PATENT DOCUMENTS

| | | | | |
|---|---|---|---|---|
| CN | 102029981 A | * | 4/2011 | |
| CN | 106585547 A | * | 4/2017 | ............. B62D 37/02 |
| CN | 109050688 A | * | 12/2018 | ................ B60T 1/12 |

(Continued)

OTHER PUBLICATIONS

Search Report and Written Opinion for IT Application No. 201800021100 dated May 21, 2019, 7 pages.

*Primary Examiner* — Paul N Dickson
*Assistant Examiner* — Matthew D Lee
(74) *Attorney, Agent, or Firm* — Cantor Colburn LLP

(57) ABSTRACT

A car having: a frame; four wheels, which are mounted on the frame in a rotary manner; a body, which covers the frame; at least one compressed air tank; and at least one gas pusher, which is connected to the compressed air tank, is integral to the frame and has a plurality of nozzles, which face outwards, can be activated in order to generate respective air jets, are arranged parallel to and beside one another, have the same orientation and are sized so as to generate different pneumatic thrusts given the same pressure of the compressed air flowing in; a pressure sensor, which determines a pressure inside the compressed air tank; and a control unit, which activates the plurality of nozzles in a coordinated manner so as to generate, as a whole, a desired pneumatic thrust based on the pressure inside the compressed air tank.

14 Claims, 4 Drawing Sheets

(56) References Cited

U.S. PATENT DOCUMENTS

2005/0230176 A1   10/2005   Wang
2007/0062740 A1 *  3/2007   Schmidt .................. B60K 6/46
                                                       180/2.1

FOREIGN PATENT DOCUMENTS

| | | | | |
|---|---|---|---|---|
| CN | 109204302 | A * | 1/2019 | .............. B62J 27/00 |
| CN | 209535029 | U * | 10/2019 | ................ B60T 1/12 |
| DE | 102008037801 | A1 * | 2/2010 | ............ B60T 8/3275 |
| DE | 102008037803 | A1 | 2/2010 | |
| DE | 102009059803 | A1 | 9/2010 | |
| DE | 102011113515 | A1 * | 11/2012 | ................ B60T 1/12 |
| DE | 102011113516 | A1 | 3/2013 | |
| DE | 102014220172 | A1 * | 4/2016 | ................ B60T 1/12 |
| FR | 2931440 | A1 * | 11/2009 | ............ B62D 37/02 |
| WO | 2007144914 | A1 | 12/2007 | |
| WO | 2008074608 | A1 | 6/2008 | |
| WO | 2009083010 | A1 | 7/2009 | |
| WO | WO-2014206642 | A1 * | 12/2014 | .............. B62J 27/00 |

\* cited by examiner

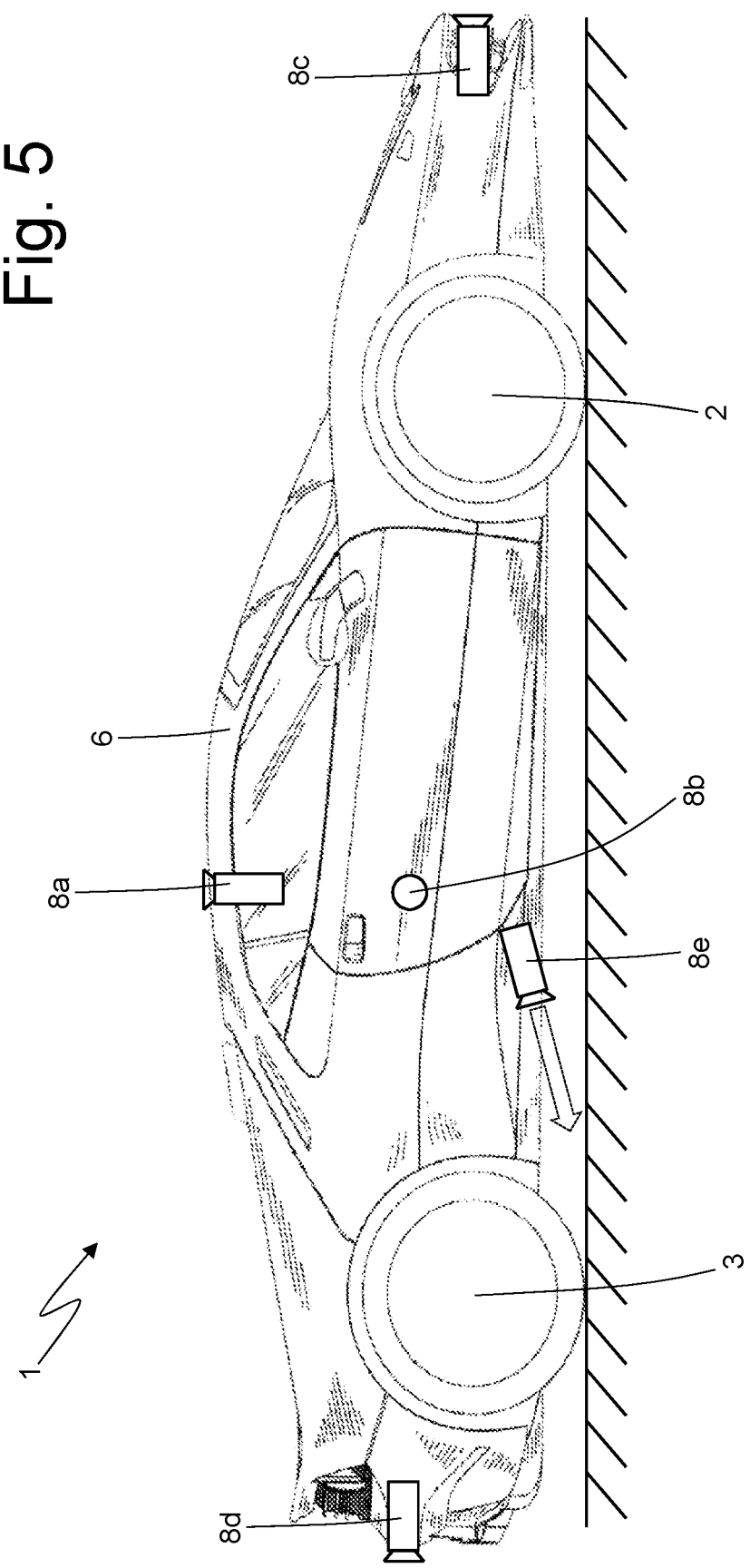

HIGH-PERFORMANCE CAR WITH GAS PUSHERS

CROSS-REFERENCE TO RELATED APPLICATIONS

This patent application claims priority from Italian patent application no. 102018000021100 filed on Dec. 27, 2018, the entire disclosure of which is incorporated herein by reference.

TECHNICAL FIELD

The invention relates to a high-performance car with gas pushers.

PRIOR ART

In a conventional car, all the accelerations to which the car is subjected derive from the interaction between the tyres and the road surface; as a consequence, when the tyres reach their grip limit, the accelerations to which the car is subjected cannot be increased any further (and, hence, the performances of the car cannot be increased any further).

Patent application WO2007144914A1 describes a road vehicle (car or motorcycle), which is provided with a compressed air tank and with gas pushers connected to the compressed air tank; in case of emergency, the gas pushers are operated so as to generate, in the road vehicle, a (transversely oriented) additional thrust with a pneumatic origin, which stabilizes (as much as possible) the road vehicle.

Patent applications WO2008074608A1, DE102008037803A1, DE102009059803A1, DE102011113513A1, DE102011113516, WO200345749A1, US20050230176A1 and WO2009083010A1 as well as U.S. Pat. No. 3,719,256A describe a car, which is provided with single-use gas pushers using a propellant (namely, pyrotechnic gas pushers); in case of emergency (for example, when the car is losing grip or risks rolling over or is about to hit a front obstacle), the gas pushers are operated so as to generate, in the car, a (transversely, longitudinally or vertically oriented) additional pneumatic thrust, which stabilizes or slows down (as much as possible) the car.

Patent application CN104309563A describes a car, which is provided with gas pushers consisting of pulsejets; in case of emergency (for example, when the car is losing grip or risks rolling over or is about to hit a front obstacle), the gas pushers are operated so as to generate, in the car, a (transversely, longitudinally or vertically oriented) additional pneumatic thrust, which stabilizes or slows down (as much as possible) the car.

Patent applications WO2014090439A1, WO2014206642A1 and WO2018001587A1 describe a motorcycle, which is provided with a compressed air tank and with gas pushers connected to the compressed air tank; in case of emergency (for example, when the motorcycle is losing rip and risks falling), the gas pushers are operated so as to generate, in the motorcycle, a (transversely oriented) additional thrust with a pneumatic origin, which stabilizes (as much as possible) the motorcycle.

U.S. Pat. No. 2,724,450A describes a car, which is provided with orientable gas pushers, which are connected to the exhaust duct of the internal combustion engine: in use, the exhaust gas is emitted by the gas pushers in order to generate, in the car, an additional pneumatic thrust.

Patent application CN102514557A1 and patent U.S. Pat. No. 6,191,686B1 describe a car, which is provided with a compressed air tank and with gas pushers connected to the compressed air tank; in case of emergency (for example, when the car is losing grip or is about to hit a front obstacle), the gas pushers are operated so as to generate, in the car, a (transversely, longitudinally or vertically oriented) additional pneumatic thrust, which stabilizes or slows down (as much as possible) the car.

DESCRIPTION OF THE INVENTION

The object of the invention is to provide a high-performance car with gas pushers, which is capable of increasing the performances of the car.

According to the invention, there is provided a high-performance car with gas pushers according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein:

FIG. 5 is a schematic side view of the car of FIG. 1.

PREFERRED EMBODIMENTS OF THE INVENTION

Figure 1:
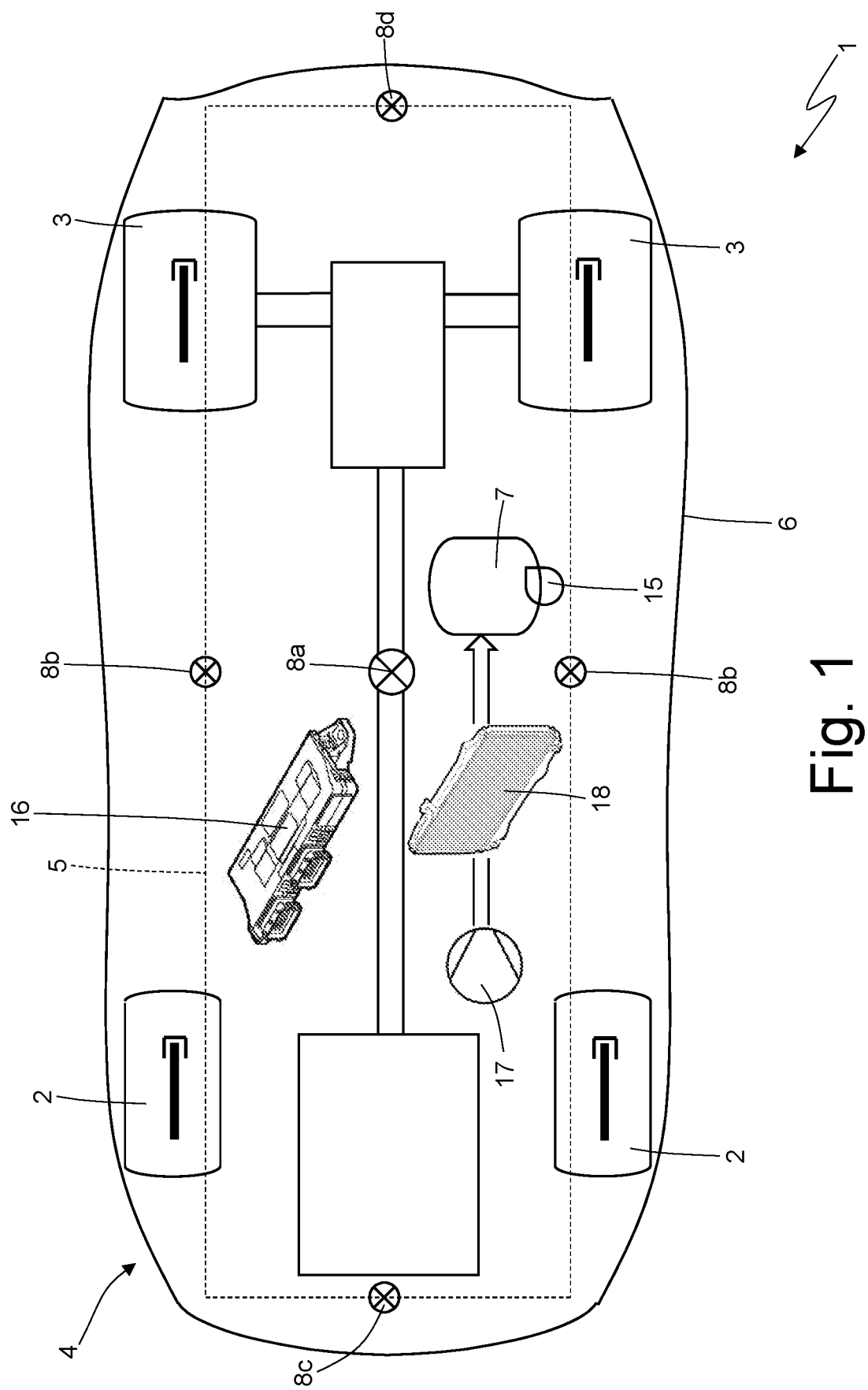
FIG. 1 is a schematic plan view of a high-performance car with gas pushers.

In FIG. 1, number 1 indicates, as a whole, a car provided with two front wheels 2 and two rear drive wheels 3, which receive the torque from a powertrain system 4. The powertrain system 4 can be an exclusively heat-based system (namely, solely comprising an internal combustion heat engine), a hybrid system (namely, comprising an internal combustion heat engine and at least one electric motor) or an electric system (namely, solely comprising one or more electric motors).

The car 1 comprises a frame 5, which supports the powertrain system 4 and the wheels 2 and 3 (namely, the four wheels 2 and 3 are fitted to the frame 5 in a rotary manner through the corresponding suspensions). Furthermore, the car 1 comprises a body 6 (better shown in FIG. 5), which covers the frame 5 and is mounted on the frame 5.

The car 1 comprises at least one compressed air tank 7, which, for example, could have a nominal pressure of 700-900 bar. In the embodiment shown in FIG. 1 there is one single compressed air tank 7, but, according to other embodiments which are not shown herein and are perfectly equivalent, different compressed air tanks 7 are provided, which can be permanently connected to one another in a pneumatic manner (so as to have the same inner pressure) or can be pneumatically independent of one another.

The car 1 comprises a plurality of gas pushers 8 (namely, pneumatic pushers 8), each of which is connected to the compressed air tank 7 in order to receive compressed air from the compressed air tank 7, is integral to the frame 5

(namely, transmits the pneumatic thrust to the frame 5) and has a plurality of nozzles 9 (shown in FIGS. 2 and 3), which face outwards (from the body 6 and, hence, from the car 1) and can be activated so as to each generate an air jet flowing out of the nozzle 9. The pneumatic thrust generated by each gas pusher 8 directly acts upon the frame (namely, upon the structure) of the car 1 without using the tyres of the wheels 2 and 3.

Figure 3:
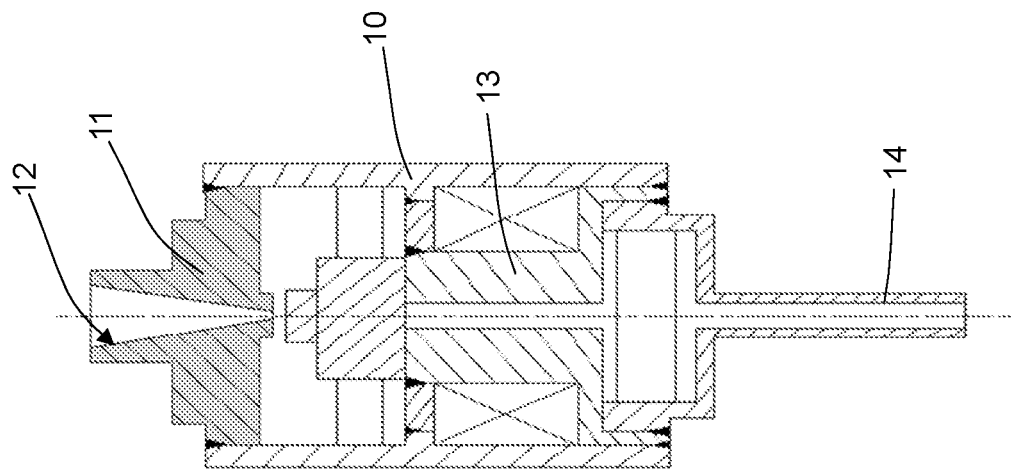
FIG. 3 is a schematic cross-sectional view of an emission device of the gas pusher of FIG. 2.

According to FIG. 3, each nozzle 9 comprises a tubular and cylindrical support body 10 containing an emitter 11, where an outlet opening 12 is obtained, through which compressed air flows out. Furthermore, each nozzle 9 comprises an electromagnetic adjustment valve 13, which can be controlled so as to open or close the nozzle 9, namely so as to generate or not to generate the air jet flowing out of the nozzle 9. Each nozzle is connected to the compressed air jet 7 (namely, receives air from the compressed air jet 7) through a duct 14. Each nozzle 9 is shaped so as to generate a supersonic air jet, namely an air jet in which the air has a greater speed than sound speed.

Basically, each nozzle 9 is a valve, which opens and closes—upon command—a compressed air flow, which is accelerated during the expansion at supersonic speed.

Figure 2:
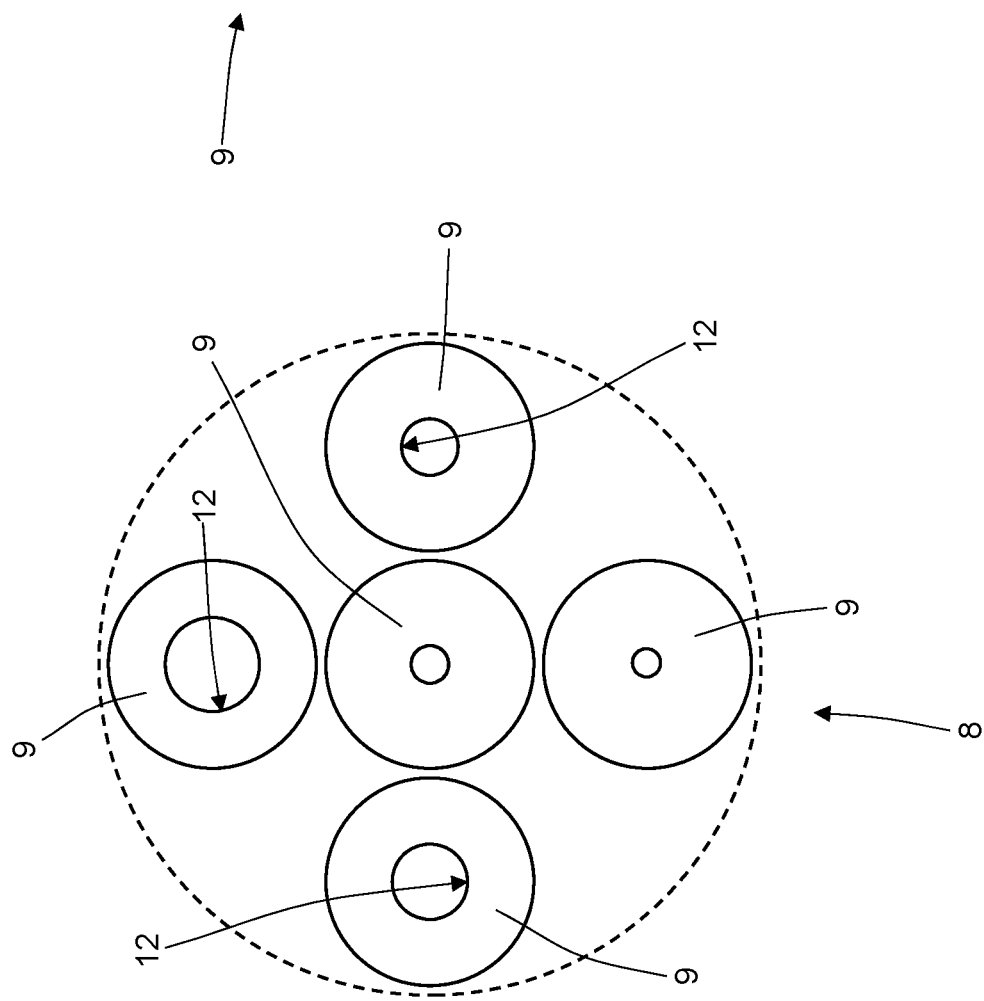
FIG. 2 is a schematic view of a gas pusher of the car of FIG. 1.

According to FIG. 2, each gas pusher 8 comprises a plurality of nozzles 9, which are arranged parallel to and beside one another, have the same orientation (namely, generate respective air jets that are parallel to one another) and are sized so as to generate different pneumatic thrusts given the same pressure of the compressed air flowing in; in other words, when the pressure of the compressed air flowing into the nozzles 9 is the same, the pneumatic thrusts generated by the different nozzles 9 of a same gas pusher 8 are different from one another. This result is normally obtained by differentiating the size (in particular, the diameter) of the outlet openings 12 of the nozzles 9 (under the same conditions, the greater the diameter of the outlet opening 12, the greater the pneumatic thrust generated).

According to FIG. 1, there is provided a pressure sensor 15, which determines (measures) a pressure inside the compressed air tank 7. Furthermore, an electronic control unit 16 is provided, which, in each gas pusher 8, activates the plurality of nozzles 9 in a coordinated manner so as to generate, as a whole, a desired pneumatic thrust based on the pressure inside the compressed air tank 7. In other words, the electronic control unit 16 determines, based on the state of motion of the car 1, when to activate each gas pusher 8 and, especially, determines the pneumatic thrust (which is force and, hence, is measured in Newton) to be generated by each gas pusher 8; once the desired pneumatic thrust of a gas pusher 8 is known, the electronic control unit 16 activates the nozzles 9 of the gas pusher 8 in a coordinated manner so as to generate, as a whole, the desired pneumatic thrust based on the pressure inside the compressed air tank 7.

Figure 4:
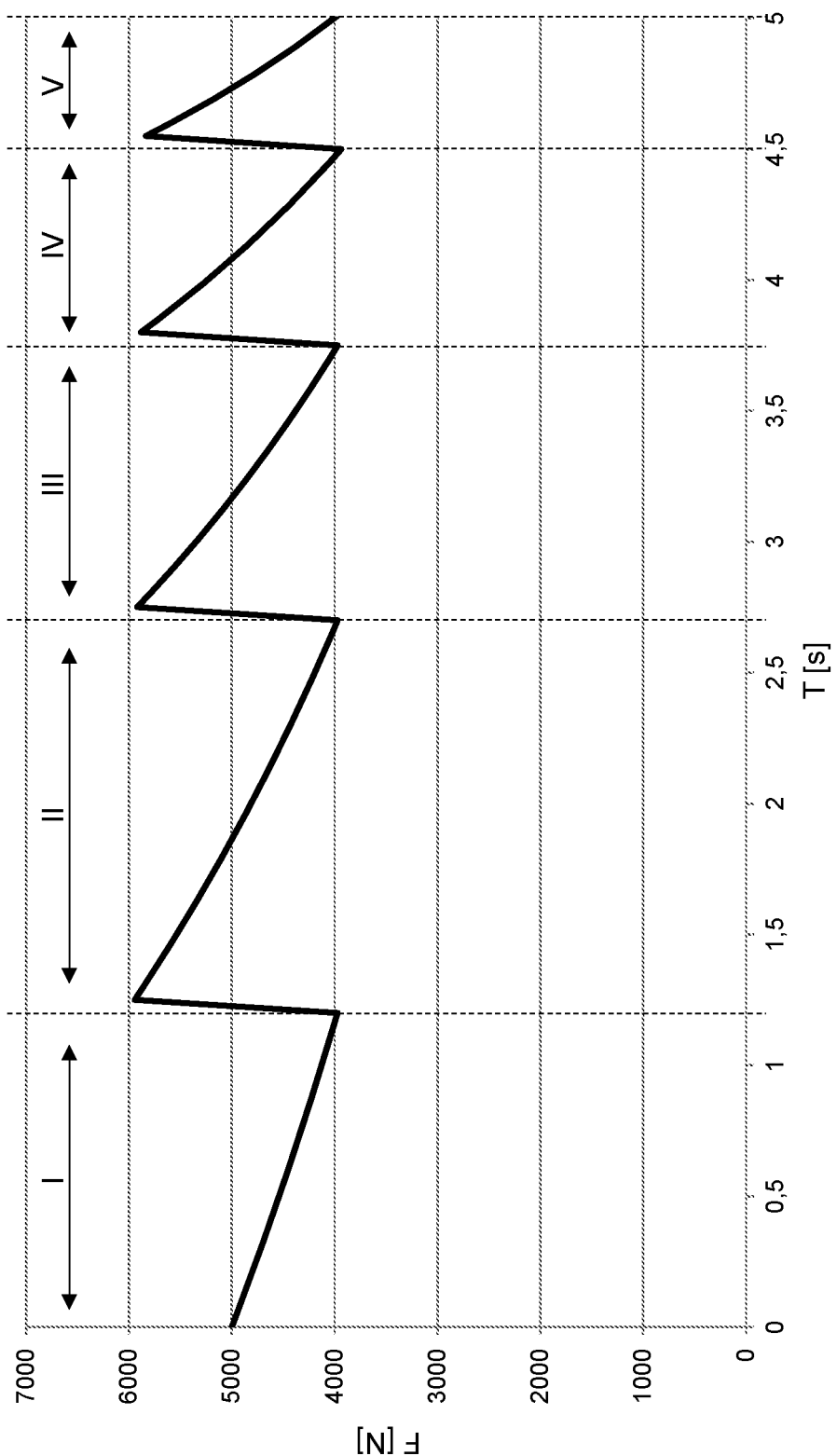
FIG. 4 is a diagram showing an operating mode of the gas pusher of FIG. 2.

According to FIG. 4, in each gas pusher 8, the control unit 16 progressively activates the nozzles 9, which, given the same pressure, would generate a greater pneumatic thrust as the pressure inside the compressed air tank 7 decreases. For example, in order to generate a desired pneumatic thrust of approximately 5000 Newton (namely, having a mean value of 5000 Newton), the control unit 16 activates, at first, the nozzle 9 with the smallest outlet opening 12 of all, which in the window I (namely, between the instant 0 and the instant 1.2) generates a pneumatic thrust ranging from 5000 to 4000 Newton, then it activates the nozzle 9 with a slightly larger outlet opening 12, which in the window II (namely, between the instant 1.2 and the instant 2.7) generates a pneumatic thrust ranging from 6000 to 4000 Newton, then it activates the nozzle 9 with a slightly larger outlet opening 12, which in the window III (namely, between the instant 2,7 and the instant 3,7) generates a pneumatic thrust ranging from 6000 to 4000 Newton, then it activates the nozzle 9 with a slightly larger outlet opening 12, which in the window IV (namely, between the instant 3.7 and the instant 4.5) generates a pneumatic thrust ranging from 6000 to 4000 Newton, and, finally, it subsequently activates the nozzle 9 with the largest outlet opening 12 of all, which in the window V (namely, between the instant 4.5 and the instant 5) generates a pneumatic thrust ranging from 6000 to 4000 Newton.

During the successive openings of the five nozzles 9, the pressure of the compressed air inside the compressed air tank 7 keeps decreasing due the continue outlet of compressed air from the compressed air tank 7; namely, with every opening (activation) of a nozzle 9 of a gas pusher 8, the pressure of the compressed air in the compressed air tank 7 constantly and quickly decreases and, hence, the pneumatic thrust generated by the nozzle 9 constantly and quickly decreases as well in the same way.

In other words, in a same gas pusher 8, the control unit 16 activates the nozzle 9 generating the pneumatic thrust closest to the desired pneumatic thrust based on the pressure inside the compressed air tank 7 and this leads to the switching, in succession, of the nozzle 9, which is activated due to the progressive decrease in the pressure of the compressed air inside the compressed air tank 7.

To sum up, the pneumatic thrust generated by each nozzle 9 basically depends on the pressure of the compressed air and on the diameter of the outlet opening 11: using the same compressed air tank 7 and different nozzles 9 of a same pusher 8, different levels of pneumatic thrust can be generated and the pneumatic pressure can remain approximately constant over time.

In the embodiment shown in FIG. 4, in a same gas pusher 8, the control unit 16 always activates one single nozzle 9 at a time; according to other embodiments, in a same gas pusher 8, the control unit 16 could also simultaneously activate different nozzles 9 so as to sum the pneumatic thrusts generated by the nozzles 9. For example, in emergency situations (for example, when there is probably going to be of a front impact that cannot be avoided using the sole braking power generated by the braking system acting upon the wheels 2 and 3), the control unit 16 is aimed at generating the maximum pneumatic thrust possible and, hence, could simultaneously open (activate), in the chosen gas pusher 8 (or in the chosen gas pushers 8), all the nozzles 9 present.

According to FIG. 1, a compressor 17 is provided, which is connected to the compressed air tank 7 and is designed to receive the motion from a front axle (namely, from the two front wheels 2) or from a rear axle (namely, from the two rear wheels 3). In other words, a rotor of the compressor 17 can be connected to the front axle (namely, to the two front wheels 2) or to the rear axle (namely, to the two rear wheels 3) in order to be operated by the front wheels 2 or by the rear wheels 3 (thus, exploiting the motion of the front wheels 2 or the motion of the rear wheels 3). In particular, the control unit 16 activates the compressor 17, using the motion received from the wheels 2 or 3, during the braking phase so as to use the kinetic energy owned by the car 1, which otherwise would be dissipated in heat by the braking system.

According to a preferred, though non-binding embodiment shown in FIG. 1, a heat exchanger 18 is provided, which is interposed between the compressor 17 and the compressed air tank 7 and is designed to cool down the compressed air fed by the compressor 17 to the compressed air tank 7, thus reducing the volume occupied by the compressed air in the compressed air tank 7; thanks to the cooling of the compressed air fed by the compressor 17 to the compressed air tank 7, a greater quantity (mass) of compressed air can be stored in the compressed air tank 7, the pressure being equal.

According to FIGS. 1 and 4, the car 1 comprises (at least) one gas pusher 8a, which is preferably arranged in the area of a centre of gravity of the car 1 and where the nozzles 9 are oriented vertically upwards; as a consequence, when it is activated, the pusher 8a generates a pneumatic thrust that pushes the car 1 towards the ground, namely increased the vertical load acting upon the car 1. The gas pusher 8a is used to increase the vertical load acting upon the car 1 and, hence, increase the total force that the tyres of the wheels 2 and 3 can release to the ground; therefore, the action of the gas pusher 8a increases the performances of the car 1 in any condition (while accelerating, braking and driving along a curve).

According to FIGS. 1 and 4, the car 1 comprises two gas pushers 8b, which are preferably arranged in the area of a centre of gravity of the car 1 and where the nozzles 9 are oriented horizontally and transversely, respectively, on a right side and on a left side; as a consequence, when they are activated alternatively (namely, never together, but always one at a time), the pushers 8b generate a pneumatic thrust that transversely (laterally) pushes the car 1 to the ground. Each gas pusher 8b is used to counter the centrifugal force developed while driving along a curve and, hence, to increase the maximum speed at which the curved is covered.

According to FIGS. 1 and 4, the car 1 comprises a gas pusher 8c, which is arranged in a front position and where the nozzles 9 are oriented horizontally and longitudinally; as a consequence, when it is activated, the pusher 8c generates a pneumatic thrust that brakes the car 1 (namely, slows down the car 1).

According to FIGS. 1 and 4, the car 1 comprises a gas pusher 8d, which is arranged in a rear position and where the nozzles 9 are oriented horizontally and longitudinally; as a consequence, when it is activated, the pusher 8d generates a pneumatic thrust that accelerates the car 1.

According to FIG. 5, the car 1 comprises a gas pusher 8e, which is arranged in the area of a floor and where the nozzles 9 are oriented towards a road surface and towards the back of the car 1; as a consequence, when it is activated, the pusher 8e generates a pneumatic thrust between the floor of the car 1 and the road surface, which accelerates the air flow under the car 1 and, hence, due to a Venturi effect, decreases the pressure of the air under car 1, thus increasing the vertical load acting upon the car 1 and, hence, increasing the total force that can be released by the wheels 2 and 3 to the ground; therefore, the action of the gas pusher 8e increases the performances of the car 1 while accelerating and driving along a curve.

According to other embodiments which are not shown herein, the gas pushers 8 could have a different arrangement: for example, the gas pusher 8a could be arranged closer to (even in the area of) the front axle or it could be arranged closer to (even in the area of) the rear axle.

According to other embodiments which are not shown herein, the car 1 could comprise a greater number of gas pushers 8: for example, two gas pushers 8a arranged in the area of the front axle and of the rear axle, four gas pushers 8b arranged in pairs in the area of the front axle and of the rear axle, two or more gas pushers 8c, two or more gas pushers 8d or two or more gas pushers 8a.

According to other embodiments which are not shown herein, the car 1 could comprise a smaller number of gas pushers 8: for example, there could be the sole gas pusher 8a, there could be the sole gas pushers 8b, there could be the sole gas pusher 8c, there could be the sole gas pusher 8d or there could be the sole gas pusher 8e.

Generally speaking, the use (the presence) of the gas pusher 8a is more convenient when the tyres of the wheels 2 and 3 are high-performance tyres and have a friction coefficient of more than 1, since the friction coefficient of more than 1 allows for a multiplication of (namely, an increase in) the final effect of the pneumatic thrust acting vertically: for example, a greater vertical load of 1000 Newton generated by the gas pusher 8a translates into a greater acceleration force acting upon the vehicle equal to 1500 Newton, if the friction coefficient between the tyres and the road surface is 1.5 (maximum value of a racing slick tyre), and, on the other hand, translates into a greater acceleration force acting upon the vehicle equal to 800 Newton, if the friction coefficient between the tyres and the road surface is 0.8 (typical value of a good road tyre for common use). Hence, when the friction coefficient between the tyres and the road surface is greater than 1, it is more convenient to use the gas pusher 8a, whose action is "multiplied", whereas, when the friction coefficient between the tyres and the road surface is smaller than 1, it is more convenient to use the gas pushers 8b, 8c and/or 8d

Furthermore, the gas pushers 8a-8d, in order to have a significant effect, require a not too low pressure of the compressed air inside the compressed air tank 7; on the contrary, the gas pusher 8e has a significant effect even when the pressure of the compressed air inside the compressed air tank 7 is lower, for the main aim of the gas pusher 8e is not to generate a relevant pneumatic thrust, but is the generation of a depression under the floor of the car 1.

Obviously, when the gas pushers 8 are activated, attention should be paid to not "jeopardizing" ("damaging") the aerodynamics of the car 1 in order to avoid experiencing a loss of aerodynamic load when there is a gain thanks to the pneumatic thrust generated by the gas pushers 8; for example, the gas pushers 8 could be used only at low speeds (for example, when staring from a still position or when driving along a very sharp bend) or in case of emergency (typically, an emergency braking).

According to a different embodiment which is not shown herein, there is not a compressor 17 (and, as a consequence, there also is not a heat exchanger 18) and, hence, the compressed air tank 7 is only filled when the car 1 is standing still by means of an external filling system; in this case, obviously, the gas pushers 8 are used rarely and in case of emergency (namely, in case of an immediate danger) or they are used in case of very short road stretches (for example, when the best time has to be obtained in a single lap of a track).

According to a different possible embodiment, the gas pushers 8 do not operate through compressed air (namely, they do not receive compressed air from the compressed air tank 7, which is not present), but are pulsejets, which are supplied with a liquid fuel (typically, the same liquid fuel supplying an internal combustion heat engine of the powertrain system 4, namely petrol or Diesel) to generate a high-speed gas flow, which flows out of the corresponding nozzle 9; in this embodiment, each gas pusher 8 comprises one single nozzle 9, as the adjustment of the pneumatic thrust is carried out by adjusting the supply of liquid fuel. A pulsejet is a very simple form of jet engine, in which the combustion takes place in an intermittent manner generating a pulsed thrust; the combustion produces a high-pressure gas, which expands up to supersonic speed in the nozzle 9.

The embodiments described herein can be combined with one another, without for this reason going beyond the scope of protection of the invention.

The car 1 described above has numerous advantages.

First of all, the car 1 disclosed above allows for an effective and efficient achievement of performances that are significantly higher than the performances of a similar car 1 without the gas pushers 8.

Furthermore, the car 1 disclosed above experiences a modest weight increase compared to a similar car 1 without the gas pushers 8, since the gas pushers 8 and the compressed air tank 7 can generate, as a whole, a weight increase of approximately 40-45 kg. To this regard, it should be pointed out that the gas pushers 8 are very small and, hence, their integration in the car 1 is relatively simple, whereas the compressed air tank 7 is more large-sized, but it can easily be placed in the empty spaces available in the car 1, which otherwise would not be used.

LIST OF THE REFERENCE NUMBERS OF THE FIGS 1 car
2 front wheels
3 rear wheels
4 powertrain system
5 frame
6 body
7 compressed air tank
8 gas pusher
9 nozzle
10 support body
11 emitter
12 outlet opening
13 adjustment valve
14 duct
15 pressure sensor
16 control unit
17 compressor
18 heat exchanger

The invention claimed is:

1. A car (1) comprising:
a frame (5);
four wheels (2, 3), which are mounted on the frame (5) in a rotary manner;
a body (6), which covers the frame (5);
at least one compressed air tank (7);
a pressure sensor (15), which determines a pressure inside the compressed air tank (7); and
at least one gas pusher (8), which is connected to the compressed air tank (7), is integral to the frame (5), has at least one nozzle (9) facing outwards, and can be activated in order to generate an air jet flowing out of the nozzle (9); and
a control unit (16), which activates the gas pusher (8) in case of need;
the car is characterized in that:
the gas pusher (8) comprises a plurality of nozzles (9), which are arranged parallel to and beside one another, have the same orientation, and are sized so as to generate different pneumatic thrusts given the same pressure of the compressed air flowing in;
the control unit (16) activates the plurality of nozzles (9) in a coordinated manner so as to generate, as a whole, a desired pneumatic thrust based on the pressure inside the compressed air tank (7).

2. The car (1) according to claim 1, wherein the control unit (16) progressively activates the nozzles (9), which, given the same pressure, would generate a greater pneumatic thrust as the pressure inside the compressed air tank (7) decreases.

3. The car (1) according to claim 1, wherein the control unit (16) activates the nozzle (9) generating the pneumatic thrust that is closest to the desired pneumatic thrust based on the pressure inside the compressed air tank (7).

4. The car (1) according to claim 1, wherein the nozzles (9) comprise respective outlet openings (12) having different diameters.

5. The car (1) according to claim 1 and comprising a compressor (17), which is connected to the compressed air tank (7) and is designed to receive the motion from at least one wheel (2, 3).

6. The car (1) according to claim 5, wherein the compressor (17) is designed to receive the motion from a front axle comprising two front wheels (2).

7. The car (1) according to claim 5, wherein the control unit (16) activates the compressor (17), using the motion received from at least one wheel (2, 3), during the braking phase.

8. The car (1) according to claim 5 and comprising a heat exchanger (18), which is interposed between the compressor (17) and the compressed air tank (7) and is designed to cool the compressed air supplied by the compressor (17) to the compressed air tank (7).

9. The car (1) according to claim 1 and comprising a first gas pusher (8a), which is preferably arranged in the area of a centre of gravity of the car (1) and whose nozzles (9) are oriented vertically upwards.

10. The car (1) according to claim 1 and comprising two second gas pushers (8b), which are preferably arranged in the area of a centre of gravity of the car (1) and whose nozzles (9) are oriented horizontally and transversally on a right side and on a left side, respectively.

11. The car (1) according to claim 1 and comprising a third gas pusher (8c), which is arranged in a front position and whose nozzles (9) are oriented horizontally and longitudinally.

12. The car (1) according to claim 1 and comprising a fourth gas pusher (8c), which is arranged in a rear position and whose nozzles (9) are oriented horizontally and longitudinally.

13. The car (1) according to claim 1 and comprising a fifth gas pusher (8d), which is arranged in the area of a platform and whose nozzles (9) are oriented towards a road surface and towards the back of the car (1).

14. The car (1) according to claim 1, wherein each nozzle (9) is designed to emit an air jet with a supersonic speed.

* * * * *